United States Patent [19]
Christy

[11] 3,788,529
[45] Jan. 29, 1974

[54] MACHINE FOR DISPENSING AND DISTRIBUTING DRY FLOWABLE MATERIALS

[76] Inventor: Daniel Lamar Christy, 118 Birchard Ave., Fremont, Ohio 43420

[22] Filed: July 14, 1971

[21] Appl. No.: 162,337

Related U.S. Application Data

[62] Division of Ser. No. 641,725, April 26, 1967, Pat. No. 3,637,112.

[52] U.S. Cl.................. 222/314, 222/342, 222/414
[51] Int. Cl. ........................................... G01f 13/00
[58] Field of Search.... 222/314, 317, 342, 352, 414

[56] References Cited
UNITED STATES PATENTS

| 3,238,919 | 3/1966 | Meyer | 222/314 X |
|---|---|---|---|
| 3,190,506 | 6/1965 | Selzler | 222/314 |
| 2,065,717 | 12/1936 | Marrsdale | 222/314 |
| 313,312 | 3/1885 | Galloway | 222/314 X |
| 858,508 | 7/1907 | Goldman | 222/342 X |
| 2,208,474 | 7/1940 | Carroll | 222/352 X |

*Primary Examiner*—Samuel F. Coleman
*Assistant Examiner*—Frederick R. Handren
*Attorney, Agent, or Firm*—Donnelly, Maky, Renner & Otto

[57] ABSTRACT

A machine for dispensing comminuted, granular, powdered, flaked, or otherwise divided dry flowable edible or non-edible materials onto the upper surfaces of edible or non-edible articles or products, with an adjustable material discharge flow, onto a rotatable roll which, in turn, carries the material thereover and discharges such material downwardly onto and over the articles or products therebelow in a substantially evenly disseminated and uniform manner.

8 Claims, 3 Drawing Figures

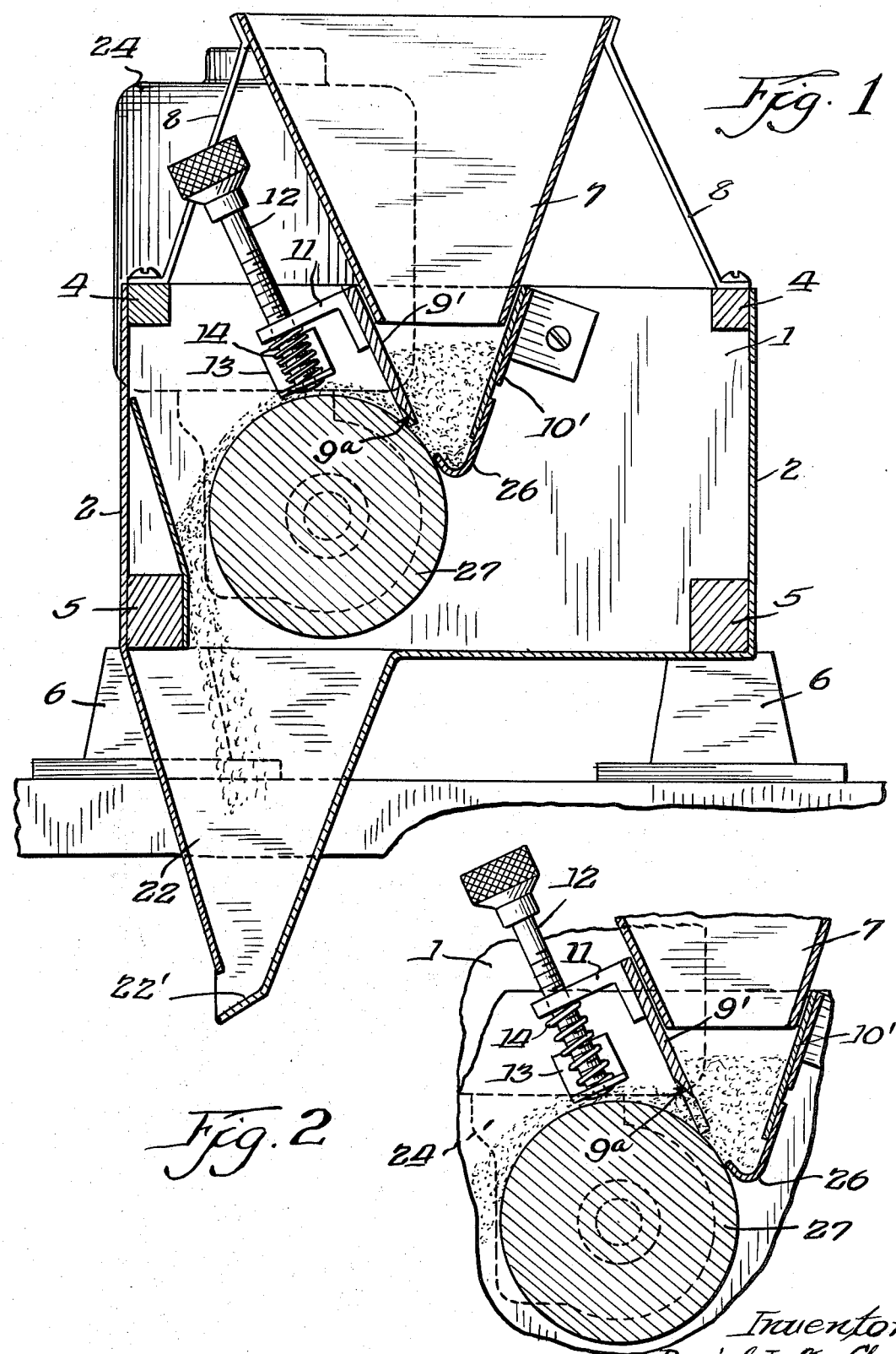

MACHINE FOR DISPENSING AND DISTRIBUTING DRY FLOWABLE MATERIALS

CROSS-REFERENCE TO RELATED APPLICATIONS

This application is a division of my copending U.S. application Ser. No. 641,725, filed Apr. 26, 1967, now U.S. Pat. No. 3,637,112, granted Jan. 25, 1972.

BACKGROUND OF THE INVENTION

This invention relates to improvements in machines for effecting the controlled discharge, by sprinkling or dispersion, of various forms of flowable dry, or substantially dry, edible or non-edible matters onto edible or non-edible products, such for example, though in no manner so limited, as the evenly scattered discharge of salt, sugar, edible seeds or other taste improving, garnishing or decorative matters onto biscuits, crackers, potato and other edible chips, pretzels, rolls, and other bakery or edible products, or non-edible appearance embellishing and/or utilitarian materials or matters onto non-edible products; the machine being of that general type as described and claimed in my U.S. Patents numbered 3,070,264 and 3,073,607.

Heretofore, machines used to disperse edible and/or non-edible products with dry or substantially dry flowable materials have not been entirely satisfactory primarily because of their cost and complexity, and they have not always been as dependable as they might be.

SUMMARY OF THE INVENTION

With the foregoing in mind, it is a principal object of this invention to provide a machine of the type indicated which is relatively economical in operation and of a relatively simple and low cost construction.

Another object is to provide such a machine in which flakes, granular, powdered, and similar materials or products (either edible or non-edible) are delivered in substantially regulated free and constant flow to a dispensing roll which receives the material and carries the material on its peripheral surface and discharges the material therefrom in disseminated, even and uniform fashion for deposit on a receiving body.

Still another object of this invention is to provide such a machine which prevents compacting or packing of material or products and thus prevents flow stoppage of the material which flows in measured amounts from the machine hopper onto the dispensing roll thereby assuring continued or steady supply to the roll.

Yet another object is to provide such a machine which by reason of its simplicity of construction and arrangement of parts may be readily and thoroughly cleaned and maintained in compliance with required sanitation ordinances.

These and other objects of the present invention may be achieved using a machine having a material receiving and dispensing roll disposed adjacent one side of a hopper having downwardly converging generally planar chute plates. One of the chute plates has a trough-like lip on the lower end thereof which maintains a constant and level reservoir of material assuring a free and uniform supply thereof to the rotating dispensing roll by which it is carried upwardly thereover and discharged from the opposite side thereof. The other chute plate may be adjusted either upwardly or downwardly toward and away from the upturned edge of the trough-like lip on the first-mentioned chute plate for increasing and decreasing the flow of dispensable material laterally onto the periphery of the roll. The bottom edge of the outer chute plate is beveled to permit the other chute plate to be moved closely adjacent to the periphery of the roll when a minimum lateral outflowing of material from the chute plates is desired without damaging or causing frictional drag on the peripheral surface of the roll.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

BRIEF DESCRIPTION OF THE DRAWINGS

FIG. 1 is a vertical transverse section through a preferred form of material dispensing machine in accordance with this invention;

FIG. 2 is a fragmentary vertical transverse section similar to FIG. 1 but showing the flow density control plate in the upward adjusted position maximizing the size of the discharge way between the chute plates to increase the lateral outflow of material onto the dispensing roll.

DESCRIPTION OF THE PREFERRED EMBODIMENT

Figure 3:
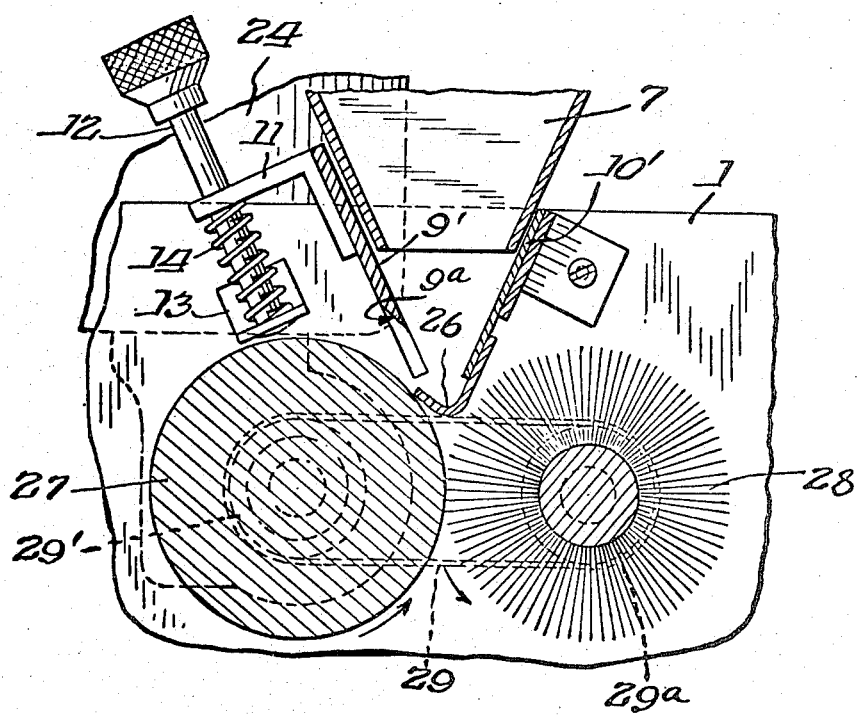
FIG. 3 is a fragmentary vertical transverse section similar to FIG. 2 but showing a rotary brush adjacent the dispensing roll for removing material adhering to the peripheral surface thereof.

Referring now in detail to the drawings and first especially to FIG. 1 thereof, the machine of the subject invention comprises a substantially rectangularly shaped body including end walls 1 and side walls 2. The end walls 1 are of sufficient thickness and strength to effectively mount and support the various working parts or components of the machine, and the side walls 2 are secured to longitudinally disposed frame bars 4 and 5, the latter having legs 6 connected thereto and fixedly mounted on the spaced transverse bars or rails of a suitable bed. A hopper 7 is received in and extends longitudinally of the body where it is supported by legs 8 mounted on and connected to appropriate portions of the frame bars 4.

The lower end of the hopper 7 is open and is nestingly engaged by downwardly converging chute plates 9' and 10' which extend closely adjacent to and are in communicative relation with the outer periphery of a dispensing roll 27 adjacent the upper portion of one side thereof in a manner to be more fully described hereafter. The dispensing roll 27 is longitudinally disposed in the machine body with the ends thereof suitably journaled in the end walls 1 for rotation of the dispensing roll therewithin.

The chute plate 10' is fixed and non-adjustable and carries a trough-like inwardly disposed flange or lip 26 on and along its lower side. The free and upwardly disposed inner side of the lip is closely adjacent the outer periphery of the dispensing roll 27 along the upper portion of one side thereof and is in approximate alignment with the roll side of the chute plate 9'.

As clearly shown in FIGS. 1 and 2, the chute plate 9' is adjustable upwardly and downwardly toward and away from the upturned lip 26 in suitable ways in the inner sides of the end walls 1 to control the density or rate of flow of the dispensed material. Preferably, the lower side of the chute plate 9' is beveled as at 9a so that when the blade 9' is moved from the uppermost position shown in FIG. 2 to the lowermost position shown in FIG. 1, the beveled lower side 9a will be spaced slightly from the roll periphery to provide a minimum lateral outflowing of material from the chute plates. In consequence, damaging of and frictional drag on the peripheral surface of the dispensing roll 27 is prevented.

To effect vertical adjustment of the chute plate 9', longitudinally spaced brackets 11 are fixed to and carried by the plate 9' and threadedly engaged by adjusting screws 12 rotatively engaged with and supported by other angle brackets 13 fixedly mounted on the inner side portions of the end walls 1. Coiled springs 14 are engaged over the lower end portions of each of the adjusting screws 12 in bearing engagement with adjacent portions of the angle brackets 11 and 13 to exert a drag influence on their respective screws preventing too free rotation thereof following their turning to adjusted positions. As will be apparent, rotation of the adjusting screws 12 in opposite directions causes the chute plate 9' to be raised or lowered for increasing and decreasing the size of the flow discharge opening between the chute plate 9' and 10'.

The material receiving and dispensing roll 27 is driven in a counter-clockwise direction as seen in FIGS. 1 through 3 by a motor (not shown) suitably mounted on the machine body thus to carry the metered discharge flow of material from the way between the chute plates 9' and 10' laterally and outwardly therefrom onto and along the upper portion of the inner side of the roll periphery, from whence it is carried upwardly and outwardly thereover avoiding or preventing its packing or partially solidifying and resultant flow stoppage or other irregular or unsatisfactory dispensing. Moreover, a reservoir of the salt or material will be maintained constant and level in the trough-like lip 26, thus assuring a free and uniform supply thereof to the rotating dispensing roll by which it will be carried upwardly thereover and discharged or cascaded from its opposite side in an advantageously effected dispersed form for even and uniform delivery onto the edible or non-edible objects therebelow.

The wall of the machine body may be inwardly inclined as shown in FIG. 1 adjacent the opposite side of the roll 27 to provide a discharge way for the roll dispensed material, and a material receiving and dispensing hopper-like chute 22 may be provided below the dispensing roll for receipt of the roll discharged material. The lower end of the chute 22 is desirably formed with a laterally directed discharge way, the lower side or lip of which is angled, as at 22' in a mannner to deflect the dispersed material impinging thereupon outwardly and downwardly whereby the material will be thoroughly dispersed or spread in its downward passage to and onto receiving bodies therebelow, thus effectively and evenly coating the same.

With the stopping of the rotation of the dispensing roll 27, the dispensable material, as for example, salt remaining on or touching the inner side of the roll periphery will fall away or tumble therefrom back into the trough-like lip 26.

If desired, the dispensing roll 27 may be provided with a rotatable brush 28 mounted in and longitudinally of the machine body in apposed and bristle contacting engagement with the roll periphery as shown in FIG. 3. To effect rotation of the brush 28, a suitable type of belt or chain drive 29, shown in dotted lines, may be employed, being engaged with a pulley 29' on the mounting of the roll 27, with a similar pulley 29a mounted on the brush 28. The effect of the brush 28 is to maintian the periphery of the dispensing roll clear of the material being dispensed or encrustations thereof. Additionally, the brush 28 by contacting the rotating roll 27 will create a turbulence or agitation beneficial to accomplishing a dispersed spread or disseminated discharge of material therefrom, assuring an even and uniform coating on the receiving articles.

As shown in FIGS. 1 and 2, the flow density control chute plate 9' may be adjusted either upwardly or downwardly and retained with relation to the inner and up-disposed side of the trough-like lip 26 for increasing or decreasing the flow of dispensable material laterally onto the roll periphery to the desired extent. When the plate 9' is in its down position shown in FIG. 1, as when a minimum lateral outflowing of material from the chute plates is occurring, its beveled lower side 9a is spaced slightly from the roll periphery, as is the upturned inner side of the lip 26, thus avoiding any damage or frictional drag on the peripheral surface of the roll.

From the foregoing, it will now be apparent that an important and essential characteristic or feature of the present invention resides in the manner or method of delivering salt or other divided material to the dispensing roll 27 of the machine. The material is supplied from the machine hopper to and between the chute plates 9', 10', from which the material flows in selectively metered quantity to the roll 27. By reason of the lateral out-flowing of the loosely lying salt or other dry flowable material via the level seeking and maintained feed or supply thereof from the reservoir between the plates, a dependably constant and uniform delivery and sprinkling onto the receiving products is assured. As the loose salt or other dry flowable material is discharged from the lateral and outward outlet provided by the metering discharge way between the chute plates, the supply thereof is constantly maintained. The receiving roll, rotating at a preselected speed, acts to displace the outflowing material and convey it upwardly thereover from whence it is discharged in cascade-like form onto receiving products. It is to be noted and emphasized that the dispensing roll does not pick up the material from the chute plates near or at the bottom of the roll. Rather, once the flow of the material reaches a level between the plates and the upper portion of the dispensing roll, the material freely spills over onto the roll and is carried upwardly thereby for the ultimate cascade-like discharge therefrom.

It should be understood that the dispensing roll may, if desired or required, be replaced by other and similar rolls whose peripheral surfaces are plain, smooth, indented, or formed or provided with corrugations or pockets of different forms and sizes dependent upon the character and kind of materials which are to be dispensed by the machine. It should also be understood that the machine may be employed equally advantageously for dispensing, coating, and/or sprinkling both edible and non-edible material onto edible and non-edible bodies or products.

It should also be understood that the machine of the present invention may be constructed in different widths to vary the output or discharge of the flowable material therefrom, and that two or more of the machines may be arranged in endwise relation to increase the width or output of flowable materials therefrom. The machines may also be arranged, if desired, in relatively tandem relation to assure a satisfactory coating of edible or non-edible objects moving therebeneath.

The embodiments of the invention in which an exclusive property or privilege is claimed are defined as follows:

1. A machine for dispensing and distributing flowable particulated material onto and over a receiving body comprising a hopper for the material, said hopper having a bottom outlet for discharge of the material therefrom, a pair of relatively converging generally planar chute plates extending downwardly from said hopper in communication with said hopper outlet, a roll rotatably supported below and offset laterally from said chute plates, the chute plate furthest from said roll having an upturned lip on the lower end thereof lying generally in the plane of the chute plate closest to said roll to define a lateral discharge way therebetween for the material adjacent the upper portion of one side of said roll, said upturned lip having an upwardly disposed inner side closely adjacent the outer periphery of said roll along such upper portion of one side thereof, said upturned lip providing a substantially constant and level reservoir of material to be supplied to said roll through said lateral discharge way, and means for rotating said roll in a direction causing the material to flow laterally outwardly through said lateral discharge way and onto said roll for discharge from the opposite side of said roll.

2. The machine of claim 1 further comprising a material receiving and dispensing chute below said roll for receipt of the material discharged from the opposite side of said roll, said material receiving and dispensing chute being formed with a laterally directed discharge way having an angled lip on the lower side thereof for deflecting the material impinging thereupon outwardly and downwardly for thoroughly dispersing or spreading the material in its downward passage.

3. The machine of claim 1 wherein means are provided for moving the chute plate closest to said roll toward and away from the upturned lip on the other chute plate for decreasing and increasing the size of said lateral discharge way for decreasing and increasing the flow of material laterally onto the periphery of said roll.

4. The machine of claim 3 wherein the bottom edge of said movable chute plate facing said roll is beveled to permit said movable chute plate to be moved closely adjacent the periphery of said roll when a minimum lateral outflowing of material is desired without damaging or causing frictional drag on the periphery of said roll.

5. The machine of claim 3 wherein said means for moving the chute plate closest to said roll toward and away from the upturned lip on the other chute plate comprises a stationary bracket, an adjusting screw rotatably supported by said stationary bracket, a movable bracket carried by said movable chute plate, said adjusting screw having threaded engagement with said movable bracket whereby rotation of said adjusting screw causes movement of said movable chute plate toward and away from said upturned lip, and spring means surrounding said adjusting screw between said brackets which provides a resistance to turning of said adjusting screw.

6. The machine of claim 1 further comprising a rotatable brush mounted in apposed and bristle contacting engagement with the roll periphery immediately below said upturned lip, and means for rotating said brush to maintain the periphery of said roll clear of the material being dispensed.

7. The machine of claim 6 wherein said means for rotating said brush comprises drive means between said roll and brush, whereby rotation of said roll causes rotation of said brush.

8. The machine of claim 1 further comprising a material receiving and dispensing chute below said roll for receipt of the material discharged from the opposite side of said roll, and an inwardly inclined wall adjacent the opposite side of said roll for directing the roll dispensed material into said material receiving and dispensing chute.

* * * * *